R. RITZENHOFF.
INSIDE VESSEL FOR FISH KETTLES AND FOR OTHER COOKING UTENSILS.
APPLICATION FILED DEC. 11, 1909.
1,032,084.
Patented July 9, 1912.
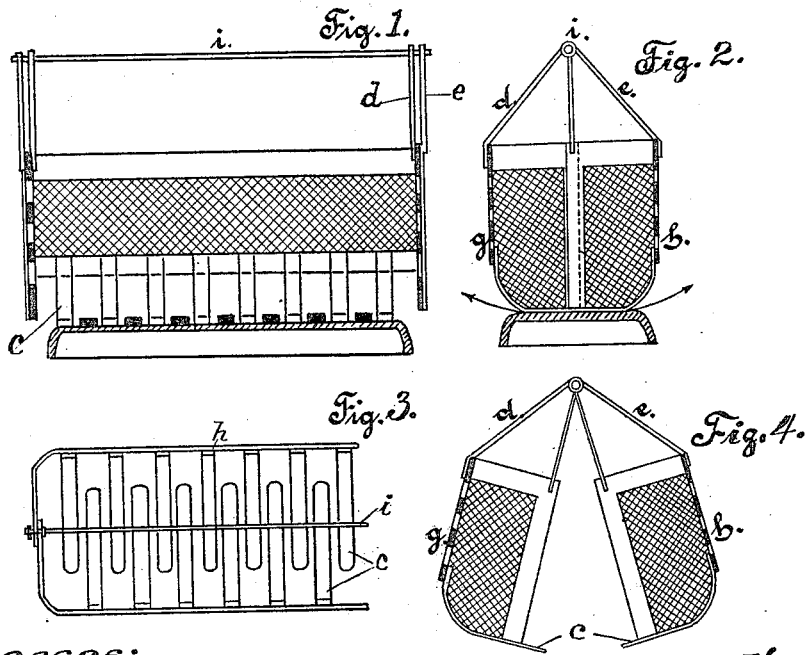

UNITED STATES PATENT OFFICE.

ROBERT RITZENHOFF, OF HEIDELBERG, GERMANY.

INSIDE VESSEL FOR FISH-KETTLES AND FOR OTHER COOKING UTENSILS.

1,032,084. Specification of Letters Patent. Patented July 9, 1912.

Application filed December 11, 1909. Serial No. 532,718.

*To all whom it may concern:*

Be it known that I, ROBERT RITZENHOFF, a subject of the German Emperor, residing at 39 Schillerstrasse, Heidelberg, Germany, have invented a new and useful Improvement in Cooking Utensils, of which the following is a specification.

An object of the invention is to provide a vessel to be inserted into a kettle or the like and to contain fish or other articles of food to be cooked.

A further object of the invention is to provide a vessel such as described, with a grid of convenient construction, whereby the food article, being cooked, may be kept out of contact with the bottom of the kettle and thereby, to avoid burning the food.

A still further object is to provide means for removing said article of food from the vessel without touching the said food with other utensils or with the hands.

With the foregoing and other objects in view, the invention consists in the details of construction and in the arrangement and combination of parts to be hereinafter more fully set forth and claimed.

In describing the invention in detail, reference will be had to the accompanying drawings forming a part of this specification, wherein like characters denote corresponding parts in the several views, in which—

Figure 1 is a longitudinal, vertical section through the cooking vessel embodying a form of my invention; Fig. 2 is a transverse vertical sectional view; Fig. 3 is a detail plan view; and Fig. 4 is a vertical, transverse view in section showing the vessel in bifurcated position.

In the modified forms shown in Figs. 3, 3ª, 4 and 4ª, the inside vessel comprises two separable halves $g$ and $h$, having extensions $d$ and $e$, respectively. The extensions furnish two pivotal points on the axial center line of a rod $i$, which forms a pivot, uniting the halves $g$ and $h$ and also serves as a handle for the vessel. In this construction, the grid fingers $c$ are preferably secured to, or made integral with, the walls of the vessel, and arranged in staggered relation, as shown in Fig. 4. These fingers are also preferably interlapped as shown.

I claim—

1. A cooking utensil comprising a container consisting of two similar and pivotally united half sections, each section carrying a series of parallel fingers arranged in normally interlapped and spaced relation with the fingers of the other section, the ends of the fingers being normally in proximal and spaced relation with the wall carrying the other series of fingers.

2. A cooking utensil comprising two similar and pivotally connected sections having substantially vertical walls, each wall carrying downwardly and inwardly curved fingers extending laterally into proximal and spaced relation with the other wall and into interlapped and spaced relation with the fingers thereof, and adapted to be moved out of interlapped relation by partial rotation of the said sections on their pivotal connection.

ROBERT RITZENHOFF.

In presence of—
WALTER STRACK,
LOUIS VANDORY.

---

Copies of this patent may be obtained for five cents each, by addressing the "Commissioner of Patents, Washington, D. C."